(12) United States Patent
Challoner et al.

(10) Patent No.: US 6,289,733 B1
(45) Date of Patent: Sep. 18, 2001

(54) PLANAR VIBRATORY GYROSCOPES

(75) Inventors: Anthony D. Challoner, Manhattan Beach; Wallace H. Sunada, Los Angeles; Donald R. Cargille, Culver City, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/310,898

(22) Filed: May 12, 1999

(51) Int. Cl.[7] .................................................... G01P 9/04
(52) U.S. Cl. ..................................... 73/504.12; 73/504.04
(58) Field of Search ........................... 73/504.02, 504.03, 73/504.04, 504.08, 504.12, 504.13, 504.14, 504.15, 514.29, 514.32, 514.33

(56) References Cited

U.S. PATENT DOCUMENTS

| | | | |
|---|---|---|---|
| 5,226,321 | * 7/1993 | Varnham et al. | 73/504.13 |
| 5,665,915 | * 9/1997 | Kobayashi et al. | 73/514.32 |
| 5,783,749 | * 7/1998 | Lee et al. | 73/504.12 |
| 5,894,090 | * 4/1999 | Tang et al. | 73/504.04 |
| 5,905,202 | * 5/1999 | Kubena et al. | 73/504.12 |
| 6,009,751 | * 1/2000 | Ljung | 73/504.02 |

OTHER PUBLICATIONS

Wright, David, et al. "The HRG Applied to a Satellite Attitude Reference System", *Guidance and Control 1994*, American Astonautical Society, vol. 86, Advances in the Astronautical Sciences.

Tang, Tony K., et al. "Silicon Bulk Micrromachinged Vibratory Gyroscope", *1996 Solid–State Sensor and Actuator Workshop*, Transducer Research Foundation, Hilton Head, South Carolina, Jun. 2–6, 1996.

Putty, Michael W., et al. "A Micromachined Vibrating Ring Gyroscope", *1994 Solid–State Sensor and Actuator Workshop*, Transducer Research Foundation, Hilton Head, South Carolina, Jun. 13–16, 1994.

Barbour, N., et al. "Micromechanical SiliconInstrument and Systems Development", *AIAA Guidance Navigation and Control Conference*, Paper No. 96–3709, San Diego, CA, Jul. 29–31, 1996.

Johnson, Jack D., et al. "Surface Machined Angular Rate Sensor", *A1995 SAE Conference*, Paper No. 950538.

\* cited by examiner

*Primary Examiner*—Helen Kwok
(74) *Attorney, Agent, or Firm*—Terje Gudmestad (57) ABSTRACT

Planar vibratory gyroscope structures are provided which are inherently symmetric, which facilitate the use of simple monolithic fabrication processes and which enable the use of sensitive control and sense systems. A planar vibratory member of these structures has a hollow frame, a plate that has a plate perimeter and is positioned within the frame and a plurality of elongate beams which couple the plate to the frame wherein each of the beams is proximate to and substantially parallel to a respective portion of the plate perimeter. The exterior rim of the planar member can be supported by a substrate which provides room for easy access to the plate with mode control and sense systems.

25 Claims, 5 Drawing Sheets

| PARAMETER | SYMBOL | UNITS | DESIGN 1 | DESIGN 2 | DESIGN 3 |
|---|---|---|---|---|---|
| Plate Thickness | $h$ | mm | 0.40 | 0.80 | 4.00 |
| Plate Width | $w$ | mm | 2.40 | 4.80 | 24.00 |
| Beam Width | $t$ | mm | 0.08 | 0.16 | 0.80 |
| Plate-Electrode Gap | $d_o$ | $\mu$ | 6.3 | 12.6 | 31.4 |
| Rocking Mode | $\omega_t$ | kHz | 32 | 13 | 3.2 |
| Axial Mode | $\omega_z$ | kHz | 17 | 7.1 | 1.7 |
| Brownian Noise | $\Omega_{nB}$ | °/√hr | 0.03 | 0.008 | 0.0006 |
| Electronic Noise | $\Omega_{ne}$ | °/√hr | 0.02 | 0.007 | 0.0005 |
| Maximum Rate | $\Omega_{max}$ | °/sec | >1000 | >1000 | 640 |
| Scale Factor | $K_{sc}$ | mv/rad/sec | 2.6 | 35 | 5710 |

FIG. 13

PLANAR VIBRATORY GYROSCOPES

BACKGROUND OF THE INVENTION

1. Field of the Invention

The present invention relates generally to gyroscopes and more particularly to vibratory gyroscopes.

2. Description of the Related Art

Gyroscopes are devices which can sense angular rotation and/or rotation rate. Accordingly, they are useful in situations (e.g., satellite attitude control) where observation of other inertial indicators (e.g., cosmic bodies such as the sun) is temporarily obscured.

A variety of gyroscope concepts have been developed. For example, gyroscopes based upon gimballed spinning wheels and gyroscopes based upon laser rings have been shown to be highly accurate. Although these devices find use in numerous applications (e.g., inertial navigation), their high expense and large size discourage a wider use.

In contrast to these gyroscopes, the concept of vibratory gyroscopes is based on rotation-induced energy exchange between modes of vibrating members. This concept is exemplified by an analysis of ringing wine glasses that was performed in 1890 by G. H. Bryan. In a flexural mode, the lip of a wine glass vibrates in elliptical-shaped modes that have two nodal diameters. When the wine glass is rotated, Bryan found that the node lines lag behind (precess) the rotation of the wine glass (e.g., during a 90° rotation, the node lines were observed to precess by ~27°). This nodal lag is, therefore, an indication of angular rotation.

Although highly accurate hemispherical resonator gyroscopes have been built using the wine glass example (e.g., see Wright, David, et al., "The HRG Applied to a Satellite Attitude Reference System", from *Guidance and Control* by Culp, R. D., et al., American Astronautical Society, 1994, volume 86, pp. 57—63), their nonplanar form is difficult to miniaturize and requires complicated, expensive fabrication processes.

Other nonplanar vibratory gyroscope structures have been investigated (e.g., see Putty, Michael W., et al., "A Micromachined Vibrating Ring Gyroscope", *Solid-State Sensor and Actuators Workshop*, Jun. 13–16, 1994, pp. 213–220). For example, cantilevered beams have been used to form vibratory gyroscopes. Experience with these devices has shown them to be difficult to mount and to be sensitive to temperature and spurious vibrations. To overcome the difficulties of cantilevered beams, tuning fork gyroscopes have been developed. These are balanced devices which are easier to mount and less sensitive to linear vibrations. However, fabrication and temperature drift problems limit the matching of input and output mode frequencies which, in turn, degrades the gyroscope's sensitivity. Misalignment of mass centers can also produce an undesirable vibration response which causes bias errors.

In contrast to these vibratory gyroscope types, the cost and size of planar vibratory gyroscopes is relatively low because they are mechanically simple (e.g., there is an absence of rotating parts) and their design typically facilitates miniaturization and batch fabrication with micromachining techniques. In addition, the precision of micromachining has enabled many vibratory gyroscopes to achieve impressive accuracy.

One conventional planar vibratory gyroscope employs a vibrating ring as its sensing element (e.g., see Johnson, Jack D., et al., "Surface Micromachined Angular Rate Sensor", 1995 *SAE Conference Paper* 950538, pp 77–83). This ring element can be considered to be a slice out of Bryan's wine glass. In a controlled resonance, the ring assumes an elliptical pattern in which four nodes on the ring have no deflection and four antinodes on the ring are each located between a pair of nodes and exhibit maximal radial deflection. In response to rotation, the angular position of the nodes lags the angular position to which the gyroscope is rotated.

Another planar vibratory gyroscope is typically referred to as a clover-leaf gyroscope (e.g., see Tang, Tony K., et al., "Silicon Bulk Micromachined Vibratory Gyroscope", 1996 *Solid-State Sensor and Actuator Workshop,* Hilton Head, S.C., June 2–6) because it has a planar member whose outline resembles a four leaf clover. This member is suspended by four thin wires or beams from a housing and a metal post is coupled to the center of the member with an orientation orthogonal to the member's plane. The thin clover leaves provide large areas for electrostatic driving and capacitive sensing.

The resonator is electrostatically excited in a control mode to rotate about a first axis of the planar member which causes the post to move in a second axis of the planar member that is orthogonal to the first axis. In response to a rotation about a third axis that is orthogonal to the member's plane, the motion of the oscillating post is displaced into movement along the first axis. This post displacement translates into a sense mode rotation of the planar member about the second axis. Essentially, the post couples energy between the control and sense modes.

Although the planar vibratory gyroscopes described above can be miniaturized and can be generally realized with low-cost micromachining techniques, they suffer from various operational defects. For example, the ring gyroscope is planar and symmetric but the sensitivity of its control and sense electrodes is degraded because of the small electrode size required to couple to the ring's flexing perimeter. In addition, the ring gyroscope's circular form degrades the precision with which it can be defined in bulk crystalline material by photographic masks. As a second example, the orthogonally mounted post of the clover-leaf gyroscope detracts from its otherwise planar configuration. The post requires a manual assembly procedure which typically degrades the gyroscope's symmetry. In addition, this gyroscope's narrow beam supports are a source of high stress and nonlinearity.

SUMMARY OF THE INVENTION

The present invention is directed to a planar vibratory gyroscope structure which is inherently symmetric, facilitates the use of simple monolithic fabrication processes and enables the use of sensitive control and sense systems.

These goals are realized with a planar gyroscopic member which has a frame, a plate that is positioned within the frame and has a plate perimeter and a plurality of elongate beams which are oriented to substantially surround the plate perimeter and arranged to be everywhere substantially equidistant from the plate perimeter.

In particular, the planar member forms a system of slots and each of the slots is at least partially interleaved between adjacent ones of the slots so to define beams which each have a first end coupled to the frame and a second end coupled to the plate and proximate to the first end of an adjacent beam.

In a four-beam embodiment of the planar member, the plate is particularly suited for vibration modes about second ends of nonadjacent beams. Because of its structural symmetry, these modes are substantially uncoupled, have substantially equal natural frequencies and the natural frequencies substantially track each other over temperature. The equal natural frequencies enhance the planar member's sensitivity to rotation and the lack of coupling reduces its sensitivity to spurious vibrations.

With the exterior rim of the planar member supported by a substrate, the plate is easily accessed with mode control and sense systems. The large area of the plate enhances the size of control and sense electrodes that are positioned proximate to the plate for excitation of controlled vibration modes and sensing of rotation-induced vibration modes. Other conventional position-sensing systems (e.g., tunneling tips) can also be positioned proximate to the plate to sense rotation-induced vibration modes. The structure of the planar member provides robust support beams which facilitate a low torsional-stress design.

The simple structure of the planar member facilitates its definition with precise photolithographic processes and subsequent low-cost fabrication (e.g., from crystalline materials such as silicon). Although a rectilinear embodiment of the planar member is especially suited for easy definition and fabrication, the teachings of the invention can be extended to other spatial realizations, e.g., a circular embodiment.

Gyroscopes formed with planar members of the invention are suited for various operational modes. In a "whole angle" mode, drive signals are applied to control electrodes to initiate a vibration about an initial axis. Rotation of the gyroscope induces, via Coriolis coupling, a small vibration about an axis that is orthogonal to the initial axis; it is therefore, a small precession of the driven vibration. Sense electrodes generate signals that are indicative of the rotation-induced precession. In a "force to rebalance" mode, the signals from the sense electrodes are fed back to the control electrodes to substantially cancel the rotation-induced precession. In this operational mode, the feedback signal is a measure of the instantaneous rotation rate. In an "open loop" mode, the rotation-induced vibration amplitude about an axis orthogonal to the drive direction is sensed as a measure of rotation rate.

The novel features of the invention are set forth with particularity in the appended claims. The invention will be best understood from the following description when read in conjunction with the accompanying drawings.

DETAILED DESCRIPTION OF THE PREFERRED EMBODIMENTS

A planar vibratory gyroscope 20 is illustrated in FIGS. 1–4. The gyroscope features a planar vibratory member 22 which is inherently symmetric, which facilitates the use of simple monolithic fabrication processes and which enables the use of sensitive control and sense systems.

In addition to the planar vibratory member 22, the gyroscope 20 includes a substrate 24 which carries the planar member 22. As particularly shown in FIG. 1, the planar member 22 has a frame 26, a plate 28 which extends laterally to a plate perimeter 30 and four elongate beams 32 which couple the plate 28 to the frame 26.

Figures 1, 2:
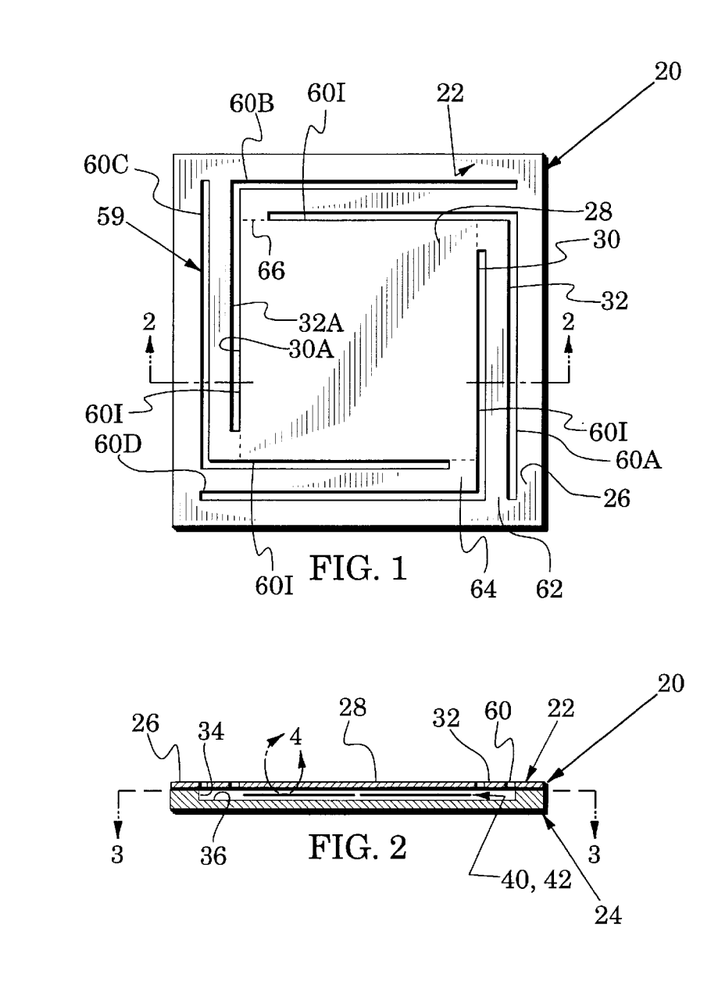
FIG. 1 is a plan view of a vibratory gyroscope embodiment of the present invention.
FIG. 2 is a view along the plane 2—2 of FIG. 1.

The beams 32 are oriented to substantially surround the plate 28 with each of the beams 32 arranged proximate to and everywhere substantially equidistant from the plate perimeter 30 (e.g., the beam 32A lies equidistant from the perimeter portion 30A). The substrate 24 has a raised rim 34 which surrounds a face 36. To support the planar member 22, its frame 26 abuts and is preferably bonded to the rim 34.

Figure 3:
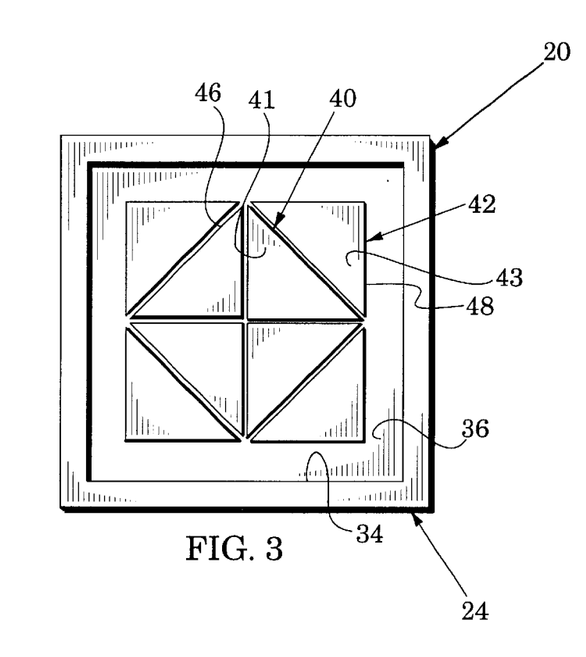
FIG. 3 is a view of the gyroscope of FIG. 1 taken along the plane 3—3 of FIG. 2, the figure shows a control electrode system and a sense electrode system.

As particularly seen in FIG. 3, the gyroscope 20 has a control electrode system 40 which includes four coplanar control electrodes 41. The gyroscope also has a vibration sensing system in the form of a sense electrode system 42 which includes four coplanar sense electrodes 43. The control electrode system 40 and the sense electrode system 42 are arranged in a coplanar relationship and positioned between the plate 28 and the substrate 24.

Figure 4:
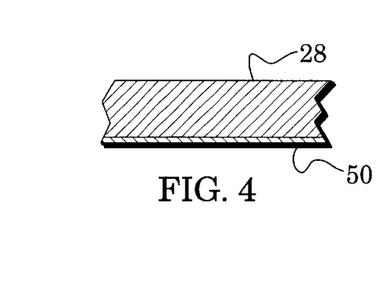
FIG. 4 is an enlarged view of structure within the curved line 4 of FIG. 2.

Each of the control electrodes 41 and the sense electrodes 43 have a triangular shape. The control electrodes 41 are grouped together so that their outer edges 46 define a square shape. The sense electrodes 43 are grouped about the square shape of the control electrodes 41 so that their outer edges 48 define another and larger square shape. The outer edges 48 preferably lie directly below the plate perimeter 30. The enlarged view of FIG. 4 shows that a conductive sheet 50 covers the underside of the plate 28 so that this conductive sheet 50 is spaced directly above the control and sense electrode systems 40 and 42.

The planar member 22 can be economically fabricated because it forms a system 59 of slots which are arranged to define the frame 26, the plate 28 and the elongate beams 32. Each of the slots is partially interleaved with two adjacent slots. For example, the slot 60B is positioned partially outside of adjacent slot 60A and partially inside of adjacent slot 60C. Each of the elongate beams 32 are configured to have a first end 62 that is coupled to the frame 26 and a second end 64 that is coupled to the plate 28. The elongate beams 32 are oriented so that the second end 64 of each beam is proximate to the first end 62 of an adjacent beam 32.

The plate perimeter 30 is substantially formed by inner portions 60I of each slot. Imaginary extension lines 66 (shown in broken lines in FIG. 1) of these inner portions indicate the plate perimeter 30 in the areas where the beam second ends 64 couple to the plate 28.

In an exemplary fabrication process, the planar member 22 and the substrate 24 are both formed of silicon. The locations of the slots 60 and the face 36 can be defined with conventional photolithographic techniques and formed by conventional etching techniques.

Figure 5:
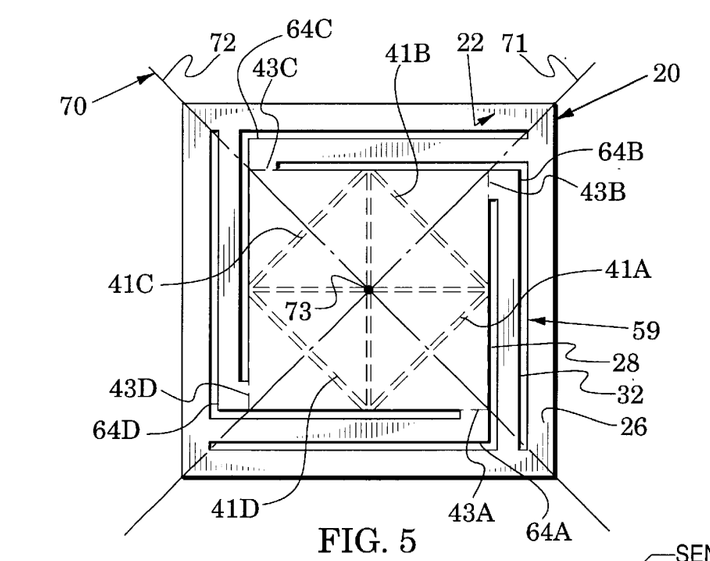
FIG. 5 is a view similar to FIG. 1 which illustrates control and sense mode axes.

To enhance a description of an exemplary operation process of the gyroscope, it is helpful in FIG. 5 to assign reference numbers 41A, 41B, 41C and 41D to the control electrodes and 43A, 43B, 43C and 43D to the sense electrodes. It is also helpful to define an orthogonal coordinate system 70 which has orthogonal axes 71, 72 and 73 (axes 71 and 72 are coplanar with the planar member 22 and the axis 73 is orthogonal to the planar member 22).

The spatial arrangement of the plate 28 and the beams 32 causes the plate 28 to be suited for a first vibration about the axis 71 (i.e., about second ends 64A and 64C of nonadjacent beams 32) and a second vibration about the axis 72 (i.e., about second ends 64B and 64D of nonadjacent beams 32). Because the planar member 22 is spatially symmetric, these vibration modes are substantially uncoupled, i.e., if the plate 28 is excited into a vibration about the axis 71 and the gyroscope is not physically rotated, substantially none of the vibration energy will be diverted into a vibration about the axis 72. This uncoupled feature of the gyroscope 20 reduces its sensitivity to spurious inputs (e.g., external vibration).

The symmetry of the planar member 22 also causes the natural vibration frequencies about the first and second axes 71 and 72 to be substantially matched. If a gyroscope's modes have different vibration frequencies, energy exchange is discouraged which means the gyroscope's rotation sensitivity is degraded. Accordingly, the high degree of matching of natural vibration frequencies found in the gyroscope 20 enhances its sensitivity.

The conductive sheet (50 in FIG. 4) on the bottom of the plate 28 forms a capacitor with each of the sense electrodes 43A–D. The capacitance of these capacitors changes as the plate vibrates about the axes 71 and 72 and this capacitance change can be sensed in any conventional capacitance-sensitive circuit (e.g., a resonant circuit). Thus, vibration of the plate 28 about the axis 71 is sensed as capacitance changes that involve the electrodes 43A and 43C. Similarly, vibration of the plate 28 about the axis 72 is sensed as capacitance changes that involve the electrodes 43B and 43D. Although the positions of the control and sense electrode systems may be interchanged, positioning the sense electrodes 43 near the plate's perimeter (30 in FIG. 1) enhances the sensing sensitivity.

By changing voltage potentials and polarities between the control electrodes 41A, 41B, 41C and 41D and the plate's conductive sheet (50 in FIG. 4), the plate 28 can be attracted to and repelled from each electrode in a controlled manner (to effect this action, the conductive sheet can be coupled through a sheet extension to a potential such as ground). For example, application of alternating voltages to the control electrodes 41A and 41C will excite a vibration of the plate 28 about the axis 71. In the absence of physical rotation of the gyroscope 20, essentially none of this vibration energy will be coupled into vibration about the axis 72 because of the uncoupled nature of the plate 28.

If the plate 28 is freely vibrating about the axis 71 and the gyroscope 20 is rotated about the axis 73, some of the energy will be converted by precession into a vibration about the axis 72. The altered vibration amplitude about the axis 71 is sensed through sense electrodes 43A and 43C and the altered vibration amplitude about the axis 72 is sensed through sense electrodes 43B and 43D. A combination of these sensed amplitudes is indicative of the precession angle and, hence, of the rotation angle through which the gyroscope was rotated. The above-described operational process of the gyroscope 20 is conventionally referred to as a "whole angle" operational mode. In this mode, vibration amplitude may be sustained, without disturbing orientation of the vibrating pattern (i.e., without inducing erroneous precession), by application of drive voltage to all electrodes at twice the vibration frequency.

Figure 6:
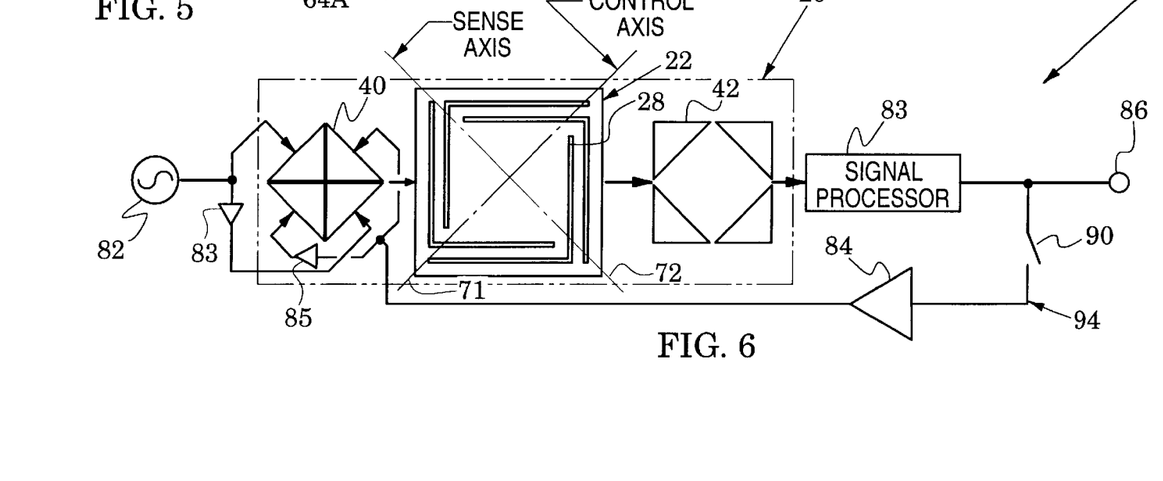
FIG. 6 is a schematized view of a gyroscope system which includes elements of the gyroscope of FIG. 1.

FIG. 6 is a schematized view of a gyroscope system 80 in which elements of the gyroscope 20 of FIGS. 1–5 are separated to enhance a further understanding of the gyroscope's operation. In particular the drive electrode system 40 and the sense electrode system 42 have been spaced on opposite sides of the planar member 22 to facilitate descriptions of gyroscopic operational processes.

The signal of a voltage generator 82 is applied differentially (indicated by inverter 83) to opposed electrodes of the control electrode system 40 to thereby control vibration of the plate 28 about a control axis 71. In a negative feedback loop 94, the output from a switch 90 is applied differentially (indicated by inverter 85) to opposed electrodes of the control electrode system so as to control vibration of the plate 28 about a sense axis 72.

In a first open loop process, a switch 90 is placed in an open position to deactivate the feedback loop 94. In response to the signal of the voltage generator 82, a vibration is induced in the plate 28 about the control axis 71. When the gyroscope is rotated about the axis 73 of FIG. 5, energy is transferred to a rotation-induced vibration whose rotation-induced axis is orthogonal to the controlled vibration axis.

Signals indicative of the rotation-induced vibration are generated by the sense electrode system 42 and coupled through a signal processor 83 to an output port 86. The signal processor 83 performs necessary signal operations (e.g., capacitance to voltage conversion and vector combination of signals from different pairs of electrodes of the sense electrode system 42) to generate a desired signal form at the output port 86. This output signal is the open loop indication of the gyroscope's rotation angle.

In a second "force to rebalance" operational process, the switch 90 is closed and the output of the signal processor 83 is coupled to the drive electrode system 40. The amplitude of the processor signal may be adjusted, e.g., through an amplifier 84. If the gain of the feedback loop 94 is sufficiently high, precession in the planar member 22 of rotation-induced vibration is substantially canceled and the output signal at the output port 86 is therefore indicative of the instantaneous rotation rate. In FIG. 6, therefore, the switch 90 is used to select between open loop and force to rebalance operational processes.

In the gyroscope system 80, the signals of the voltage generator 82 and the feedback loop 94 are applied to opposite electrodes to effect vibration modes about the axes 71 and 72. In other system embodiments, the voltage generator's signal can be applied to one adjacent pair of electrodes and the feedback loop's signal applied to the other adjacent pair. This will effect a 45° rotation of the axes 71 and 72.

Figure 7:
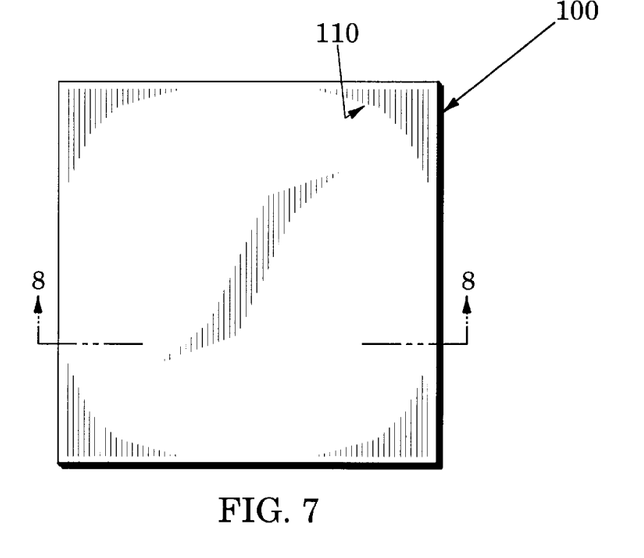
FIG. 7 is a plan view of another vibratory gyroscope embodiment of the present invention.
Figure 8:
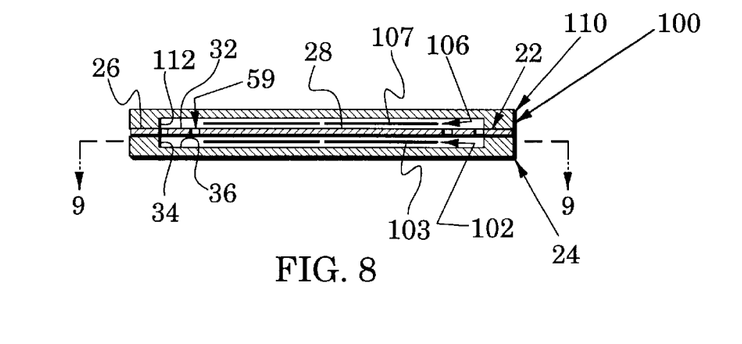
FIG. 8 is a view along the plane 8—8 of FIG. 7.
Figure 9:
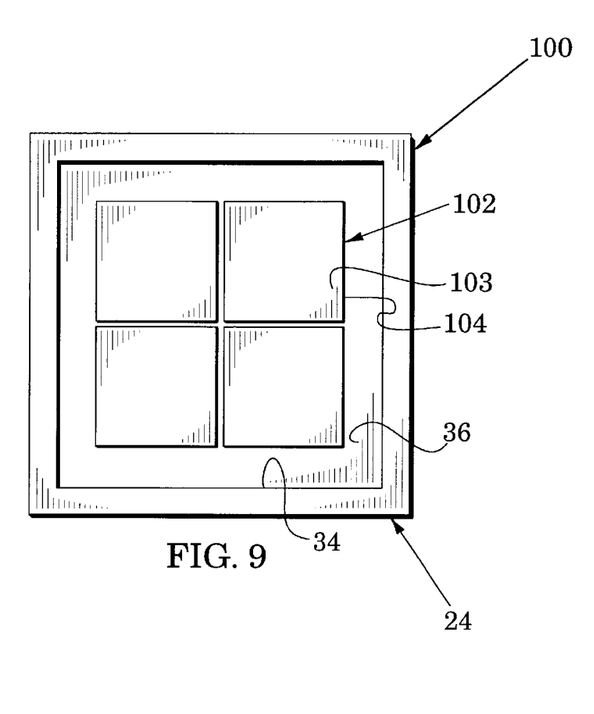
FIG. 9 is a view of the gyroscope of FIG. 7 taken along the plane 9—9 of FIG. 8, the figure shows another sense electrode embodiment.

FIGS. 7–9 illustrate another vibratory gyroscope embodiment 100 of the present invention. These views are similar to FIGS. 1–3 with like elements represented by like reference numbers. Instead of the triangularly-shaped control electrodes 41 of the gyroscope 20 (of FIG. 1), the gyroscope 100 has a control electrode system 102 that includes control electrodes 103. The latter control electrodes have a square shape, are positioned proximate to one side of the planar member 22 and are arranged so that their outer edges 104 lie directly below the plate perimeter (30 in FIG. 1).

Similarly, the gyroscope 100 has a sense electrode system 106 in which sense electrodes 107 have a square shape, are positioned proximate to an opposite side of the planar member 22 and are arranged so that their outer edges lie directly above the plate perimeter.

As in the gyroscope 20, the planar member's frame 26 abuts the rim 34 of a substrate 24. In addition, a second substrate 110 extends over and protects the sense electrode system 106. The second substrate 110 is similar to the substrate 24 and a rim 112 of the second substrate abuts and is preferably bonded to another side of the planar member's frame 26.

Because of the larger size of the control electrodes 103 and sense electrodes 107, the gyroscope 100 is more sensitive than the gyroscope 20 but the additional sensitivity is gained at the cost of increased size and complexity.

Figure 10:
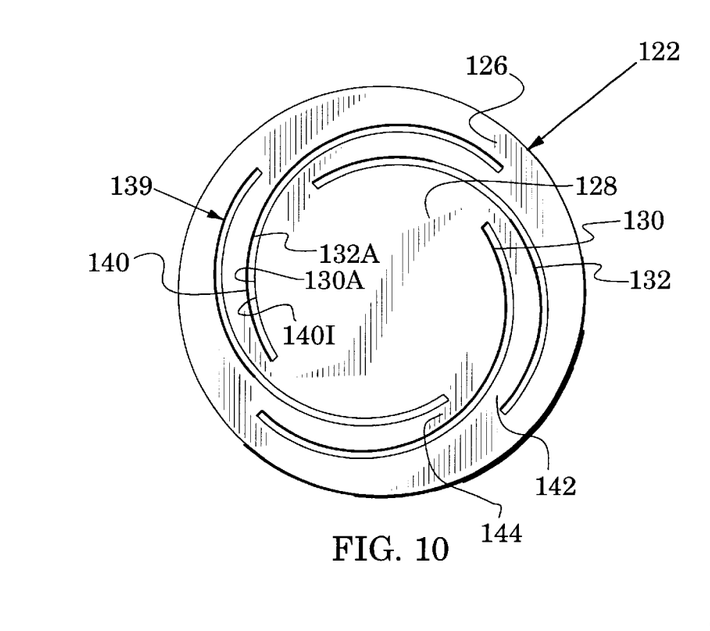
FIG. 10 is a plan view of another vibratory planar member of the present invention.

The vibratory planar member 22 of FIGS. 1 and 2 represents a rectilinear embodiment of the invention's teachings. These teachings may be extended to various other embodiments. For example, a circular embodiment 122 is illustrated in FIG. 10. In particular, the planar member 122 has a hollow frame 126, a plate 128 which extends laterally to a plate perimeter 130 and four elongate beams 132 which couple the plate 128 to the frame 126. The beams 132 are oriented to substantially surround the plate 128 and each beam 132 is arranged to be everywhere substantially equidistant from the plate perimeter 130 (e.g., the beam 132A lies equidistant from the perimeter portion 130A).

Similar to the planar member 22, the planar member 122 can be fabricated with the aid of a system 139 of slots 140 which are arranged to define the frame 126, the plate 128 and the elongate beams 132 which each have a first end 142 and a second end 144. Each of the slots 140 is partially interleaved with two adjacent slots and is configured so that the second end 144 of each beam is proximate to the first end 142 of an adjacent beam 132. The plate perimeter 130 is substantially formed by inner portions 1401 of each slot.

In the gyroscope 20 of FIGS. 1–3, a position-sensing system in the form of a sense electrode system 42 was used for sensing rotation-induced vibration modes. The gyroscope 100 of FIGS. 7–9 used a different sense electrode system 106. Other conventional position-sensing systems can be substituted to form still other gyroscope embodiments.

Figure 11A:
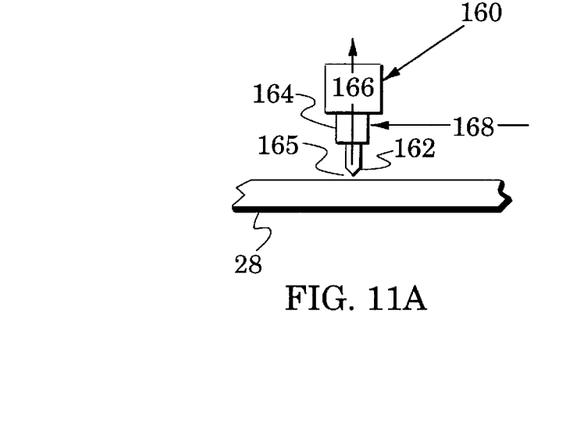
FIGS. 11A and 11B are elevation views of other position-sensing systems which can be substituted for the sense electrode systems of FIGS. 3 and 9.

For example, FIG. 11A illustrates a position-sensing system in the form of a tunneling tip 160 whose probe tip 162 is carried by a translation driver in the form of a piezoelectric transducer 164. The transducer 164 moves the probe tip 164 so as to maintain it in close proximity with the plate 28 to generate a measurable tip-to-plate interaction. An electrical potential is imposed across a tip-to-plate gap 165 and this potential causes tip and plate electrons to form a tunneling current 166 whose magnitude is extremely sensitive to the dimension of the gap 165. Typically, a control loop responds to the tunneling current 166 by applying a control signal 168 to the transducer 164. In response to the control signal, the transducer vertically translates the probe tip 162 to maintain a constant tunneling current 166. The control signal 168 is, therefore, an accurate indicator of the position of the plate 28.

Figure 11B:
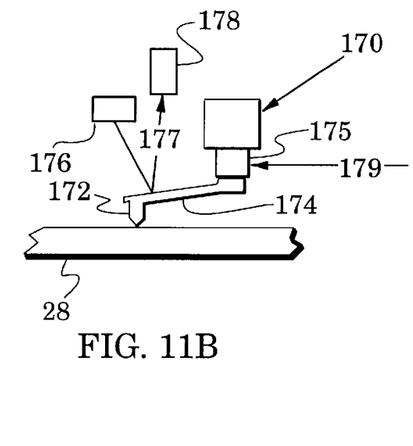

There are numerous variations of the tunneling tip 160 of FIG. 11A. One is the tip structure 170 shown in FIG. 11B. In this position-sensing system, a tip probe 172 is coupled by a resilient cantilever 174 to a translation driver 175. A laser 176 emits a laser beam 177 which is reflected from the cantilever 174 and received by a detector 178. The output signal of the detector 178 is, therefore, a function of the cantilever's deflection. Typically, a control loop applies a control signal 179 to the translation driver 175 to maintain a constant detector signal and, hence, a constant cantilever deflection. The control signal 179 is, therefore, an accurate indicator of the position of the plate 28.

Figures 12A, 13:
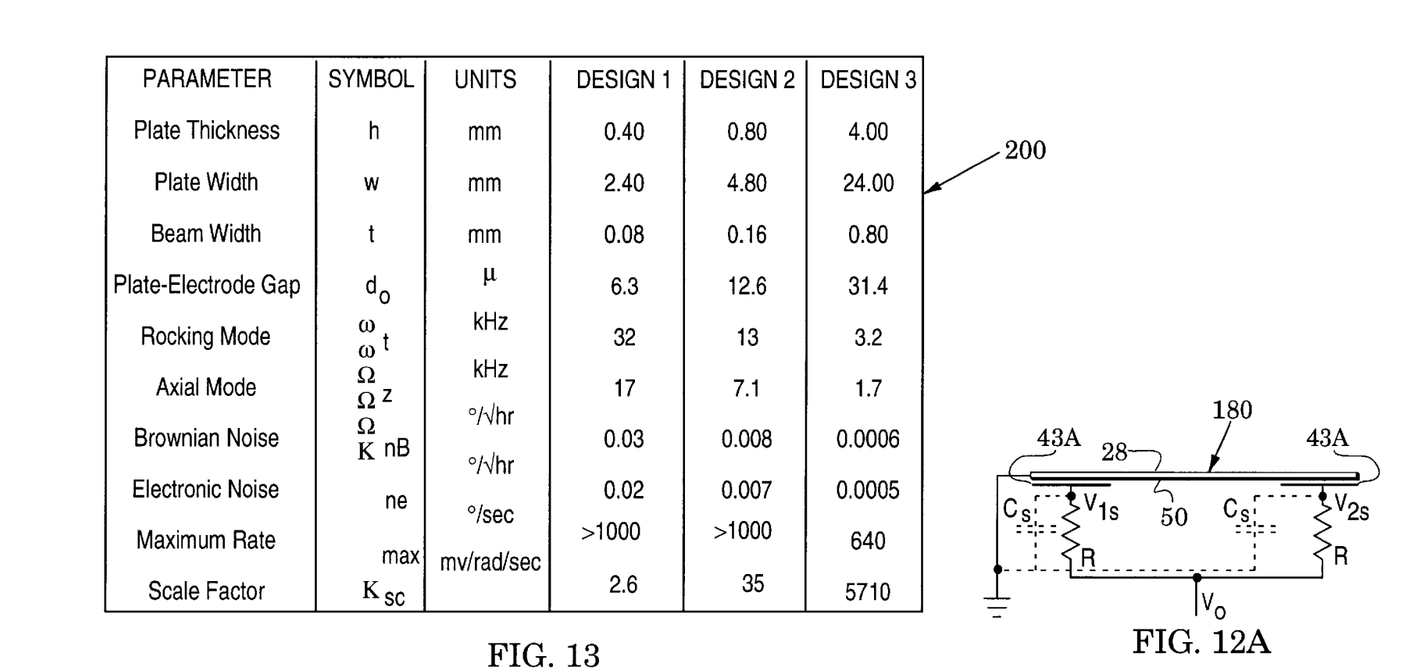
FIGS. 12A and 12B are schematics of a control electrode system and a sense electrode system in the vibratory gyroscope of FIG. 4.
FIG. 13 is a table which illustrates exemplary design parameters in gyroscope embodiments of the present invention.
Figure 12B:
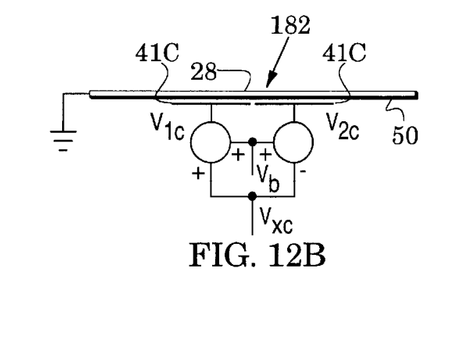

An understanding of the operation of gyroscopes of the present invention can be further enhanced by a mathematical investigation of motion in terms of the moment of inertia J and torque T in the vibratory plate 28 of FIG. 5. Accordingly, FIGS. 12A and 12B are schematics of the control and sense electrode systems of FIG. 5 taken along an exemplary x axis (axis 71 in FIG. 5). FIG. 12A shows the sense electrodes 43A and 43C that sense rotation about the x axis and FIG. 12B shows the control electrodes 41A and 41C that control rotation about the x axis. Electrode voltages along the y axis that are equivalent to those of FIG. 12A are $V_{3s}$ and $V_{4s}$ and equivalent voltages to those of FIG. 12B are $V_{3c}$ and $V_{4c}$. The electrodes have an area A, the centroids of the control electrodes are radially offset by $r_c$ and the centroids of the sense electrodes are radially offset by $r_s$.

Sense voltages that are generated in FIG. 12A are approximately proportional to plate rotation $\vartheta_x$ about the x and y axes (axes 71 and 72 in FIG. 5) and the axial translation z. The sense voltages are expressed as:

$$V_{xs}=V_{2s}-V_{1s}\equiv K_\vartheta \vartheta_x, \quad V_{ys}=V_{4s}-V_{3s}\equiv K_\vartheta \vartheta_y, \text{ and}$$
$$V_{zs}=V_{1s}+V_{2s}+V_{3s}+V_{4s}\equiv K_z z \text{ in which}$$

$$K_\vartheta = 2\frac{r_s}{d_o}\frac{C_o V_o}{C_s+C_o}, \quad K_z = \frac{4}{d_o}\frac{C_o V_o}{C_s+C_o}, \quad C_o = \frac{\varepsilon_o A}{d_o}$$

and $C_s$=input stray capcitance.

The equivalent sensor noise angle due to front end electronics noise $\epsilon_e$ is $\vartheta_{ne}+\epsilon_{ne}/K\vartheta$. The torques about the x and y axes are proportional respectively to $V_{xc}$ and $V_{yc}$, i.e., $V_{1c}+V_{xc}+V_{yc}+V_b$, $V_{2c}=-V_{xc}+V_b$, $V_{3c}=V_b$, $V_{4c}=-V_{yc}+V_b$,
$T_x \equiv K_T V_{xc}$ and $T_y \equiv K_T V_{yc}$ in which $K_T = 2r_c \dfrac{C_o V_b}{d_o}$.

Given the rotational variables, $\omega=[\omega_x, \omega_y, \Omega]$=inertial rate of the substrate 24, and
$\vartheta=[\vartheta_x, \vartheta_y, 0]$=small rotations of the plate 28 with respect to the substrate 24, the relationships $\ddot{\vartheta}_x \gg \omega_x$, $\ddot{\vartheta}_y \gg \omega_y$, $\dot{\vartheta}_x \gg \omega_x$,
$\dot{\vartheta}_y \gg \omega_y$ and $\Omega \ll \dot{\vartheta}_x$ and $\dot{\vartheta}_y$, and with the axes 71, 72 and 73 of FIG. 5 represented respectively as x, y and z, simplified equations of motion of the vibratory plate 28 have been derived as:

$J_x \ddot{\vartheta}_x+(J_z-J_y-J_x)$
$\dot{\vartheta}_y \Omega+k\vartheta x \vartheta_x=T_x,$
$J_y \ddot{\vartheta}_y-(J_z-J_y-J_x)$
$\dot{\vartheta}_x \Omega+k\vartheta y \vartheta_y=T_y,$ and $$J_x = J_y = \frac{\rho(w^2h^3 + w^4h)}{12}, \quad J_z = \frac{\rho w^4 h}{6}, \quad J_z - (J_x + J_y) = -\frac{\rho w^2 h^3}{6},$$

wherein w and h=width and thickness of the plate 28, t=width of the beams 32, E=elastic modulus of the planar member 22 and ρ=density of the planar member 22 and plate inertias and natural frequencies are given by $$\omega_x =$$

$$\omega_y = \sqrt{\frac{k_{\vartheta y}}{J_y}} \cong \sqrt{\frac{4Eh^3 t}{12w} \frac{12}{\rho(w^2h^3 + w^4h)}} = \sqrt{\frac{4Eh^2 t}{\rho w^3(h^2 + w^2)}},$$

$$\omega_z = \sqrt{\frac{k_z}{m}} \cong \sqrt{\frac{16Eh^3 t}{w^3 12} \frac{1}{\rho w^2 h}} = \sqrt{\frac{4Eh^3 t}{\rho w^5 3}},$$

$$k_{\vartheta y} \cong \frac{4EI}{w}, \quad k_z \cong \frac{16EI}{w^3} \quad \text{and} \quad I = \frac{h^3 t}{12}.$$

To lower the natural frequencies of a thick plate, its associated beams can be thinned by etching from one or both sides of the plate.

For a specific quality factor $Q_m$ and a temperature $T_{emp}$, Brownian motion causes a sensed angular rotation of, $$\alpha_{yB}^2 = \frac{4k_B T_{emp} \omega_y}{J_y Q_m}$$

in which $k_B$ is Boltzman's constant.

For ideal control and torque rebalance, pullout;zu268300.900$_x$=$\vartheta_o \omega_x$ cos($\omega_x t$) and $\vartheta_y$≡ pullout;zu268300.900$_y$≡0, respectively, which produces $$T_y = 2J_t\left(1 - \frac{J_z}{2J_t}\right)\Omega\vartheta_o\omega_x\cos(\omega_x t) = 2J_t k\Omega\vartheta_o\omega_x\cos(\omega_x t)$$

$$= K_r \Omega\cos(\omega_x t) = \frac{\rho w^2 h^3}{6}\Omega\vartheta_o\cos(\omega_x t)$$

in which $J_t = J_y = J_x$, the angular gain $k = 1 - \frac{\rho w^4 h}{\rho(w^2h^3 + w^4h)} = \frac{\gamma^2}{\gamma^2 + 1}$, $\gamma = \frac{h}{w}$, and $K_r = 2k\vartheta_o\omega_x J_t$.

It is noted that the angular gain approaches 0 for very thin plates and is ½ for a plate in the shape of a cube.

With ideal torque rebalance, the demodulated control voltage is, $$\overline{V_{yc}(2\cos\omega_x y)} \cong \frac{\overline{T_y(2\cos\omega_x t)}}{K_T} = \frac{2J_t k\Omega\vartheta_o\omega_x}{2r_c\frac{C_o V_b}{d_o}}$$

$$= \frac{J_t k\vartheta_o d_o \omega_x}{r_c C_o V_b}\Omega = K_{sc}\Omega.$$

wherein the overbar indicates a baseband signal.

Alternatively, with ideal open loop operation $T_y=0$, the demodulated sense voltage is:

$$\overline{V_{ys}(2\cos(\omega_x t + \phi_o))} \cong \overline{K_\vartheta \vartheta_y(2\cos(\omega_x t + \phi_o))}$$

$$= K_\vartheta Q_t \frac{2k\vartheta_o\omega_x}{\omega_y^2}\Omega$$

$$= 2\frac{r_s}{d_o}\frac{C_o}{C_s + C_o}Q_t \frac{2k\vartheta_o\omega_x}{\omega_y^2}\Omega$$

$$= K_{so}\Omega,$$

in which $\phi_O$ is the sense mode phase shift at the drive frequency.

$Q_t$ is the tuning gain $$Q_t = \frac{1}{\sqrt{\left(\left(\frac{\omega_x}{\omega_y}\right)^2 - 1\right)^2 + (Q_m)^{-2}}}$$

between the control and sense modes, the equivalent Brownian noise rate noise $\Omega_{nB}$ is $$\Omega_{nB} = \frac{J_t \alpha_{nB}}{K_r} = \frac{\alpha_{nB}}{2k\vartheta_o\omega_x}(\text{rad/sec})/\sqrt{\text{Hz}}$$

and the equivalent electronic rate noise $\Omega_{ne}$ is $$\Omega_{ne} = \frac{\partial_{ne}}{Q_t} = \frac{\varepsilon_{ne}}{Q_t K_\vartheta}(\text{rad/sec})/\sqrt{\text{Hz}}.$$

An exemplary relationship for $Q_t$ is $$Q_t \geq 100, \text{ when } \frac{|\omega_x - \omega_y|}{\omega_y} \leq 0.5\% \text{ and } Q_m > 1000,$$

and exemplary design parameters include the following:

| | |
|---|---|
| control amplitude $\upsilon_o$ = 0.1° | mechanical quality $Q_m$ = 50,000 (typical for crystal silicon in vacuum) |
| applied voltages $V_o = V_b = 10v$ | stray capacitance $C_s$ = 1pf |
| electronic noise $\epsilon_{ne}$ = 100 nv/√Hz | tuning gain $Q_t$ = 100. |

Performance of planar gyroscopes is degraded by the presence of noise signals, e.g., electronic noise and Brownian (thermal) noise. In the planar gyroscope 20 of FIGS. 1–4, electronic noise is reduced by increasing the width of the plate 28 and Brownian noise is generally reduced by increasing the plate's thickness. A thick plate also enhances angular gain k and, hence, scale factor sensitivity (e.g., when w=h, k=½). In contrast, a thinner plate will reduce the manufacturing time required to etch the plate's slot system 59. These are examples of various considerations which influence design selections of plate width w, plate thickness h, beam width t and the elastic modulus E and density ρ of the planar member 22.

Table 200 of FIG. 13 illustrates selected values for some of these parameters in three exemplary designs of the gyroscope embodiments of the present invention. For low cost stellar inertial navigation, a gyroscopic angle random walk of <0.03°/√hour is typically required. Design 1 in table 200, for example, has a thin plate which achieves this requirement.

It is estimated that this design can be realized at a cost of ~100 dollars/wafer with polished silicon wafers having a thickness of ~400 micrometers. It is further estimated that more than 1000 planar members can be batch fabricated and packaged using three six-inch wafers in ~2 hours based on an ion etch rate of ~3 micrometers/hour. Designs 2 and 3 gain improved performance with thicker and wider plates and thicker beams.

Lack of mechanical precision is a source of temperature-sensitive biases and drift in vibratory gyroscopes. Accordingly, bias and drift are reduced in the present invention because of its symmetry and its compatibility with photolithographic fabrication processes.

Although the planar members of the invention have been shown to have four beams of similar cross section, the teachings of the invention can be extended to configurations that have different numbers of beams and beams that have different cross sections. The beams have been shown and described as being coplanar with the plate (e.g., the beams 32 and the plate 28 of FIG. 2). Although this configuration may facilitate fabrication of the invention, nonplanar embodiments may also find utility when practicing the teachings of the invention. The conductive sheet 50 of FIG. 4 can be applied with various conventional materials and processes (e.g., silicon doping). It can be coupled to ground with various conventional structures (e.g., a sheet extension or a thin wire).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A vibratory gyroscope that senses gyroscope angular rotation, comprising:
   a planar member having:
   a) a plate that has a plate perimeter; and
   b) a plurality of elongate beams that support said plate wherein each of said beams has first and second ends and is arranged with its second end coupled to said plate perimeter and its first end proximate to the second end of an adjacent one of said beams;
   said planar member thereby configured for uncoupled vibrations about first and second vibration axes which respectively pass through the second ends of a first pair of said beams and the second ends of a second pair of said beams that alternate with said first pair about said plate perimeter;
   a control electrode system spaced from said plate and having a pair of control electrodes positioned on opposite sides of said first vibration axis to excite a controlled vibration of said plate about said first vibration axis; and
   a position-sensing system spaced from said plate and having a pair of sense electrodes positioned on opposite sides of said second vibration axis to sense a response vibration of said plate that is induced by said gyroscope angular rotation and converted by precession to be about said second vibration axis;
   said response vibration being a measure of said precession and thereby of said gyroscope angular rotation.

2. The vibratory gyroscope of claim 1, wherein said beams are oriented to substantially surround said plate and be everywhere substantially equidistant from said plate perimeter.

3. The vibratory gyroscope of claim 1, wherein:
   said control electrode system includes a second pair of control electrodes positioned on opposite sides of said second vibration axis to substantially cancel said response vibration; and
   said position-sensing system includes a second pair of sense electrodes positioned on opposite sides of said first vibration axis to sense a change in said controlled vibration that is induced by said gyroscope rotation and converted by precession to said response vibration;
   said second pairs of control electrodes and sense electrodes facilitating a force to rebalance operational mode of said gyroscope.

4. The vibratory gyroscope of claim 3, wherein said plate perimeter has a substantially square shape and each of said control electrodes and said sense electrodes has a triangular shape.

5. The vibratory gyroscope of claim 1, wherein:
   said control electrode system is spaced from one side of said plate; and
   said position-sensing system is spaced from another side of said plate.

6. The vibratory gyroscope of claim 5, wherein said plate perimeter has a substantially square shape and each of said control electrodes and said sense electrodes has a square shape.

7. The vibratory gyroscope of claim 1, wherein said first and second pairs of beams are arranged to cause said first and second vibration axes to be substantially orthogonal.

8. The vibratory gyroscope of claim 1, wherein said plate perimeter has a substantially circular shape.

9. The vibratory gyroscope of claim 1, further including:
   a hollow frame arranged about said plate perimeter and coupled to said first ends; and
   a substrate arranged to abut and support said frame.

10. The vibratory gyroscope of claim 9, wherein said control electrode system and said position-sensing system are positioned between said plate and said substrate.

11. The vibratory gyroscope of claim 9, wherein said planar member and said substrate are comprised of silicon and further including a conductive sheet coupled to said plate.

12. The vibratory gyroscope of claim 1, wherein the number of said beams is four.

13. The vibratory gyroscope of claim 3, further including a feedback control loop which couples control signals to said second pair of control electrodes in response to said first and second pairs of sense electrodes.

14. A vibratory gyroscope that senses gyroscope angular rotation, comprising:
   a planar member;
   a system of slots formed by said planar member with each of said slots at least partially interleaved between adjacent ones of said slots to define:
   a) a plate that has a plate perimeter; and
   b) a plurality of elongate beams that support said plate wherein each of said beams has first and second ends with its second end coupled to said plate perimeter and its first end proximate to the second end of an adjacent one of said beams;
   said planar member thereby configured for uncoupled vibrations about first and second vibration axes which respectively pass through the second ends of a first pair of said beams and the second ends of a second pair of said beams that alternate with said first pair about said plate perimeter;
   a control electrode system spaced from said plate and having a pair of control electrodes positioned on opposite sides of said first vibration axis to excite a controlled vibration of said plate about said first vibration axis; and a position-sensing system spaced from said plate and having a pair of sense electrodes positioned on opposite sides of said second vibration axis to sense a response vibration of said plate that is induced by said gyroscope angular rotation and converted by precession to be about said second vibration axis;

said response vibration being a measure of said precession and thereby of said gyroscope angular rotation.

15. The vibratory gyroscope of claim 14, wherein:

said control electrode system includes a second pair of control electrodes positioned on opposite sides of said second vibration axis to substantially cancel said response vibration; and said position-sensing system includes a second pair of sense electrodes positioned on opposite sides of said first vibration axis to sense a change in said controlled vibration that is induced by said gyroscope rotation and converted by precession to said response vibration;

said second pairs of control electrodes and sense electrodes facilitating a force to rebalance operational mode of said gyroscope.

16. The vibratory gyroscope of claim 15, wherein said plate perimeter has a substantially square shape and each of said control electrodes and said sense electrodes has a triangular shape.

17. The vibratory gyroscope of claim 14, wherein:

said control electrode system is spaced from one side of said plate; and said position-sensing system is spaced from another side of said plate.

18. The vibratory gyroscope of claim 17, wherein said plate perimeter has a substantially square shape and each of said control electrodes and said sense electrodes has a square shape.

19. The vibratory gyroscope of claim 14, wherein said first and second pairs of beams are arranged to cause said first and second vibration axes to be substantially orthogonal.

20. The vibratory gyroscope of claim 14, wherein said plate perimeter has a substantially circular shape.

21. The vibratory gyroscope of claim 14, further including:

a hollow frame arranged about said plate perimeter and coupled to said first ends; and a substrate arranged to abut and support said frame.

22. The vibratory gyroscope of claim 21, wherein said control electrode system and said position-sensing system are positioned between said plate and said substrate.

23. The vibratory gyroscope of claim 21, wherein said planar member and said substrate are comprised of silicon and further including a conductive sheet coupled to said plate.

24. The vibratory gyroscope of claim 14, wherein the number of said beams is four.

25. The vibratory gyroscope of claim 15, further including a feedback control loop which couples control signals to said second pair of control electrodes in response to said first and second pairs of sense electrodes.

* * * * *